(12) United States Patent
Youssef et al.

(10) Patent No.: US 11,503,058 B2
(45) Date of Patent: Nov. 15, 2022

(54) SECURITY SERVER FOR DYNAMIC VERIFICATION OF WEB CONTENT, END USERS REMOTE DEVICE, SYSTEM COMPRISING SAID END USERS REMOTE DEVICE AND SERVER, AND METHOD IMPLEMENTED BY SAID SYSTEM

(71) Applicant: WORLDLINE (SA/NV), Brussels (BE)

(72) Inventors: Mohamed Amine Youssef, Lincent (BE); Gert-Jan Andries, Begijnendijk (BE); Cédric Meuter, Berchem-Sainte-Agathe (BE); Peter Timmermans, Hoegaarden (BE)

(73) Assignee: INGENICO BELGIUM, Brussels (BE)

( * ) Notice: Subject to any disclaimer, the term of this patent is extended or adjusted under 35 U.S.C. 154(b) by 0 days.

(21) Appl. No.: 17/634,463

(22) PCT Filed: Aug. 19, 2020

(86) PCT No.: PCT/EP2020/073151
§ 371 (c)(1),
(2) Date: Feb. 10, 2022

(87) PCT Pub. No.: WO2021/037618
PCT Pub. Date: Mar. 4, 2021

(65) Prior Publication Data
US 2022/0272113 A1    Aug. 25, 2022

(30) Foreign Application Priority Data

Aug. 23, 2019 (EP) .................................... 19193499

(51) Int. Cl.
*H04L 9/40* (2022.01)
*H04L 67/50* (2022.01)
*H04L 67/025* (2022.01)

(52) U.S. Cl.
CPC ........ *H04L 63/1425* (2013.01); *H04L 67/025* (2013.01); *H04L 67/535* (2022.05)

(58) Field of Classification Search
CPC .. H04L 63/1425; H04L 67/535; H04L 67/025
See application file for complete search history.

(56) References Cited

U.S. PATENT DOCUMENTS

2019/0158532 A1    5/2019  Davidson et al.

FOREIGN PATENT DOCUMENTS

| CN | 110275958 A | * | 9/2019 | ......... G06F 16/3329 |
| CN | 110475291 A | * | 11/2019 | |

(Continued)

OTHER PUBLICATIONS

International Search Report and Written Opinion issued in corresponding International Application No. PCT/EP2020/073151, dated Nov. 9, 2020, pp. 1-12.

*Primary Examiner* — Arvin Eskandarnia
(74) *Attorney, Agent, or Firm* — Hauptman Ham, LLP

(57) ABSTRACT

A security server for dynamic verification of web content located on a platform in the cloud or in the edge which runs artificial intelligence (AI) algorithms including a collector receiving collection of user interactions from an adapted browser of a remote to simulate content of pages loaded on the device based on user interactions from an adapted browser located on the end-user device navigating on the web and for sampling the outcome of these interactions at irregular time intervals, this sample resulting a fixed image such as JPG or PNG, a data mining and artificial intelligence (AI) algorithm relying on image processing executed while sample interval to detect object or patterns on the displayed content, a heartbeat generator generates heartbeat at regular (Continued)

interval and transmits at a continuous interval to the end-user's device to indicate to the adapted browser of the device it may display the content.

12 Claims, 1 Drawing Sheet

(56) References Cited

FOREIGN PATENT DOCUMENTS

| | | | |
|---|---|---|---|
| CN | 111160915 A | * | 5/2020 |
| EP | 3783854 B1 | | 12/2021 |

* cited by examiner

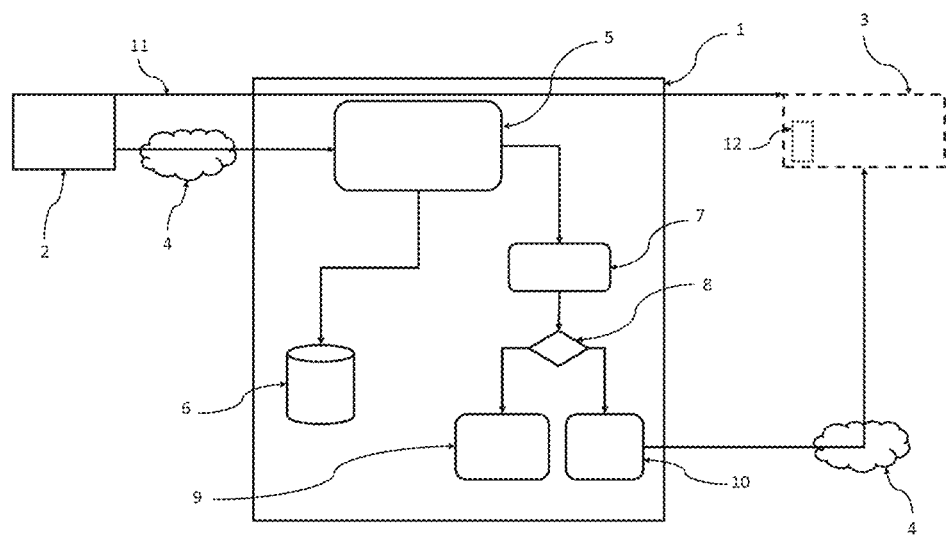

SECURITY SERVER FOR DYNAMIC VERIFICATION OF WEB CONTENT, END USERS REMOTE DEVICE, SYSTEM COMPRISING SAID END USERS REMOTE DEVICE AND SERVER, AND METHOD IMPLEMENTED BY SAID SYSTEM

RELATED APPLICATIONS

The present application is a National Phase of International Application Number PCT/EP2020/073151, filed Aug. 19, 2020, and claims priority to European Application No. 19193499.1, filed Aug. 23, 2019.

TECHNICAL FIELD OF THE INVENTION

The present invention relates generally to the field of application of IT device security such as, for example but not strictly limited to, payment terminals, smartphone, pads, PC used in financial operations or exposed to uncontrollable environment. More specifically, the invention concerns a service provider who controls the content coming from webpages, especially from webpages coming from an uncontrollable environment.

PRIOR ART

By opening a webpage there is always a risk of opening as well contents coming from uncontrollable environment, which can be a potential danger for secured devices. It is then necessary to control this content by checking the actual visible (dynamic) content displayed to the end user.

According to the prior art, such as US2016212123 A1 there are system and method for providing a digital certificate by way of a browser extension including a server system having at least one processor adapted to provide web pages to browsers of user devices. The server system is further adapted to include at least one pattern and at least one identifier in at least one web page provided to a user device, it is further structured and arranged to receive from a browser extension upon a user's device that has recognized the pattern and extracted the identifier a certificate request (CSR) and the extracted identifier, and upon verification of the identifier and the CSR, generating a certificate based at least in part on the CSR and returning the certificate to the browser extension for installation upon the user device.

Although this document teaches a browser extension to communicate with a server system, the aim of this communication is to enable the generation of a certificate.

Further this system modifies the webpages transmitted to the user device by the system by including at least one pattern and at least one identifier.

It exists the patent application US2016197948 A1 an abnormal behavior detection system that includes a context information reception unit receiving a variety of types of context information from a context information collection system. This system also includes a context information processing unit generating a corresponding detection request message when context information about web service use is received and transfer the corresponding detection request message to an abnormal detection unit, an abnormal detection unit comparing sequence of a use page and use speed, performed right after user access, with a pattern in the past access through an analysis of an initial use behavior pattern when the detection request message is received and to detect an abnormal use behavior, a profile management unit profiling pieces of context information according to various use behaviors of the user and store and manage the pieces of profiled context information, and an information analysis unit analyzing web site or data base use information.

We also know from KR101619419 B1 a system for detecting an abnormal behavior of a user in a bring your own device (BYOD) environment and a smart work environment. The system realizes a measure to detect the abnormal behavior by patterning behaviors based on various behavioral elements such as time, positions, access networks, used devices, etc. of a target object. The system promotes a system security in the BYOD environment and the smart work environment and detects the behaviors including abnormal access and use, etc. of a terminal device by using the personalized continuative behavior pattern analysis after processing the contextual information into access, use and agent contextual information and profile information.

However, the system needs to measure the abnormal behaviors by patterning behaviors and therefore is operating as a master to detect abnormal behavior of the user.

The patent application TW201719457 A, describes an online data input buffer type automatic storage system and method. The system comprises a server platform and a client webpage program, wherein the client webpage program is installed in a computer device with a client storage space, and a user can operate a user behavior by means of the computer device, the client webpage program is connected with the server platform, and when the client webpage program is operated, the client webpage program can acquire one user behavior datum, at least comprising a document or form data generated by the user behavior and save it in the client storage space, and then, the user behavior data saved in the client storage space is saved back in the service platform according to the user frequency of using the client storage space or an interval time at which the client storage space is used twice. Therefore, the user can achieve an effect of real-time save back in a server without interrupting an editing operation, so that the user can save data back in the service platform without pressing a send or save button even if a webpage browser or other applications with browser components or functions are closed for some reason.

However, such a solution has disadvantages because the client webpage program needs to be operated, and the webpage program is not an extension of the browser. Furthermore, this solution is not for determining a security issue but for achieving an effect of real-time save back in a server when webpage program is operated.

The invention therefore aims to solve other problems by proposing a server that will control the content of websites visible for the user without being interposed between website and user device so as to work in real-time mode. The whole process works in the background (edge and/or cloud).

According a further aspect the solution requiring very few modifications of user device and will also work even for a user device with limited processing and/or digital signal processing (DSP) power.

According a further advantage of the system composed by a security server and a modified user device is that the solution stays invisible for the end user at any time in the process and there is no delay for the end user.

GENERAL PRESENTATION OF THE INVENTION

To achieve at least one of these results, the present invention concerns a Security Server located on a platform in the cloud or in the edge which runs artificial intelligence (AI) algorithms comprising:

a collector receiving collection of user interactions transmitted by an adapted browser of a remote device for simulating on the server the content of the pages, loaded on the device from a website, based on user interactions send by the adapted browser located on the device of the end-user navigating on the web and for sampling the outcome of these interactions at irregular time intervals, this sample resulting in a fixed image such as JPG or PNG, a data mining and artificial intelligence (AI) algorithm relying on image processing is executed while sample interval to compare object or patterns to the fixed image corresponding to the displayed content, a heartbeat generator generates heartbeat at regular interval and send it at a continuous interval to the end-user's device to indicate in result of comparison to the adapted browser of the device it may display the content coming from website or stop the transmission of heartbeat in case of mismatch in the comparison.

According a further embodiment the server comprises, an alarm handler to log and trigger an alarm in case of a suspicious activity in form of a heartbeat and to stop the heartbeat, when the connection between the browser and the server is broken, and stop on the server the execution of artificial intelligence for this end-user so that the content is not verified anymore.

In another embodiment the server may comprise, a data provider that can provide extra information about the content to the adapted browser, this information being used by the browser to make the decision to stop showing the content.

To achieve at least one of the results, the invention also concerns an end-user remote device comprising a processing capability and maintains two separate communication channels, one for accessing the web site, and a second for accessing with the security server for the heartbeat, with at least a website and the security server and a web adapted browser with all functionalities of a 'regular' web browser but adapted in a way that it can communicate in addition with a security server, this adapted browser comprising an arrangement for setting up a connection with the security server, on detection of a page loading on the end-user's device and being adapted to memorize and send to the security server all user interactions (like for instance, touch, slide or keyboard interactions) made by the end-user and further comprising a hardware and software arrangement to be able to retrieve a heartbeat from the server on a regular interval and to invalidate the display to the end-user once this heartbeat communication is broken, or the heartbeat is not detected indicating the content displayed to the end user is not verified or contains illegal objects or patterns.

According one embodiment, after the setup of a connection with the server, the end-user remote device comprises a hardware and software arrangement to send a message to the server to trigger a heartbeat signal generation between the server and the web browser.

According another embodiment, the adapted browser manage data received from the security server to make the decision on lack of heartbeat or on presence of extra information to stop showing the content.

According another embodiment, the remote device is with limited processing and/or digital signal processing (DSP) power and is working in real-time mode.

According another embodiment, the remote device is a mobile terminal such as for instance pad, smartphone, smartwatch, personal computer (PC).

According another embodiment, the device is a payment terminal accessing not only to specific banking network but also provided with extended web connection capabilities for enabling navigation on the web to access other services and a touch screen as human interface for interactions.

At least another aim of the invention is solved by a system using a security server as briefly described above in communications between a remote device visiting a web site according to the end-user remote device as briefly described above and a web site.

At least a further aim of the invention is solved by a method executed in a system as briefly described above comprising the following steps:

1) The web content is visited on an end-user's remote (eventually mobile) device with limited processing capacities, the device being equipped with an adapted web browser as described before;

2) During the page download on the end-user's device, the adapted browser setup a connection with the security server described in the invention, during this setup, the server triggers the generation of a heartbeat signal between the server and the web browser;

3) On the end-user remote device, interactions with the web content are memorized by the adapted browser and are sent to the server on request to the server, the server access the web content visited and replays the actions of the end-user on the web content;

4) On a variable time interval, a sample of the user output is taken on the server; this sample is checked with artificial intelligence of the server against some pre-defined models and/or patterns memorized during a data mining process on a database:

5) If no similar objects or patterns are found in the sample, the server stops generation of heartbeat, and the adapted browser stops displaying the content, the decision to stop displaying the content is made by the adapted browser, using the detection of lack of the heartbeat 6) If an object or pattern similar to the one of database has been found in the sample, the heartbeat continues and the process starts again from the third step, According one embodiment of the invention the sample are resulting in a fixed image such as JPG or PNG and are compared with images of the database captured during a data mining process.

PRESENTATION OF THE ILLUSTRATIONS

Further features and advantages of the invention will become more readily apparent from the following detailed description of a preferred embodiment of the invention which proceeds with reference to the accompanying drawing showing:

FIG. 1 shows a scheme illustrating the system using the service provider of the invention.

DETAILED DESCRIPTION OF AN EMBODIMENT OF THE INVENTION

FIG. 1 shows a schematic diagram of the system using the service provider of the invention.

The invention consists out of two main parts.

First a web browser 12 on the end-user's device, it is a normal web browser with all functionalities of a 'regular' web browser but adapted in a way that it can communicate with a security server 1 located in the edge or cloud, that runs artificial intelligence (AI) algorithms 7.

This web browser 12 is sending all user interactions such as touch, slide, keyboard . . . interactions, made by the end-user to the security server 1. Next to this, the web browser 12 retrieves a heartbeat signal from the security server 1 on a regular interval. Once this heartbeat is broken, the content displayed to the end-user is not verified or contains illegal objects or patterns. The web browser 12 then stops displaying the content to the end-user.

Secondly, a security server 1 located in the cloud or edge which runs artificial intelligence (AI) algorithms 7 to verify the web content against some predefined models or patterns. The user interactions with the web content are simulated on this security server 1. This simulation is done by using the stream of events or interactions coming from the end-user's device and corresponding to the end user interactions made by end user with the website and collected by a collector. Exactly the same interactions are replayed at the server side to activate the dynamic content on this web pages. This content is then rendered and checked with the AI algorithms 7 to check if there are no illegal objects or patterns on the web content. A heartbeat is sent by the server at a continuous interval to the end-user's device to signal the content is valid. If this heartbeat drops away, the content of the page displayed on the end-user's device is invalid.

The following steps detail the basic process for using the invention.

First, the web content may be visited on a remote eventually mobile device with limited processing capacities, like for example, a pad, a smartphone, a smartwatch, or a personal computer (PC). This device is equipped with an adapted web browser 12 as described before.

Second, when the page loads on the end-user's device, a connection with the security server 1 described above is set up by the end user browser of the device. During this step, a heartbeat signal is generated by the security server 1 so as to send it regularly to the web browser 12.

Thirdly, the end-user can make interactions with the web content. All these interactions are recorded on remote device and sent by the browser to the security server 1 as described above.

Fourthly, the security server 1 replays the actions of the end-user on the web content of the website.

Fifthly, on a variable time interval, a sample of the user output is taken on the security server 1.

Sixthly, this sample is checked with AI algorithms 7 against some predefined known models and/or patterns recorded in a database obtained by data mining acquisition process. At this point 8, two ways are possible:

If known objects or patterns (no illegal object or pattern) are found in the sample; the heartbeat continuous and the process starts again from the third step.

If an illegal object or pattern (no known object or pattern) has been found in the sample; the heartbeat stops and the browser 12 stops displaying the content. The decision to stop displaying the content is made by the browser 12, using the information of the heartbeat.

This process will enable detection of fake advertisement for example.

More exactly, a web server 2 managed by a third party, will provide the content of the browser 12 and is accessible via the world wide web (internet) 4. This web server 2 may provide in the page, images such as advertisements with "install" button or "buy" button, the size of the button may be compared with the common size of the buttons collected during data mining on other websites. In this example, object may be the defined usual size of the buttons, pattern may be the usual images of such install or buy button.

Another attack against which the system is protected is the case corresponding to a web server 2 which may try to realize web fishing by furnishing a link with a download button or an URL corresponding to a site different from the one initially addressed. In that case objects to be compared may be the URL of the websites accepted as safe by the server and downloaded in the database during data mining process. Pattern could be the images contained in the first page of the website mined during the data mining process.

The invention may be useful in a system where a web server 2 may also provide data or images for displaying on an end-user's device, a pinpad or for asking the introduction of a password.

The home page of a service like a banking or insurance company or using a payment system may be hacked and when the end-user remote device asks to load the page on the website of the bank or insurance company or such web server, the user receives in fact a faked home page. The security server 1 then may compare the home pages of the majority of website downloaded 11 in the database 6 during the data mining 6 process.

The security server 1 may provide as well the comparison of the image of the pinpad with the one registered in the database for a given financial service or services.

In another fraudulent variant the web server 2 may also provide advertisement images prompting the user to introduce important and sensitive data. In that case the pattern mined will be used In another embodiment the object compared is the sequence of images. For example the security server 1 may provide the comparison of the sequence of images transmitted to end user remote device for constituting a pinpad display. Generally, a pinpad is constituted of nine button pads and a hacked webserver may in place send two frames: one containing the images of four button pads and the second containing the images of five button pads to display an element such as a pinpad.

Finally, the security server 1 may also provide sequences of images or sequences of data differing from the original initially saved in the data base which may indicate fraudulent object or patterns.

Instead, the security server 1 comprises a collector 5 who simulates the content based on the user interactions sent by the adapted browser 12 located on the device of the end-user and samples the outcome of these interactions at irregular time intervals. This sample is a fixed image such as JPG or PNG.

The security server 1 comprises also a data mining 6 arrangement to extract data (for instance in the form of images constituting objects or pattern) from the websites and an artificial intelligence (AI) algorithm 7 who process images to detect object or pattern on the displayed content.

The security server 1 comprises as well an alarm handler 9 who log and trigger an alarm in case of a suspicious activity in form of a heartbeat. When the connection between the browser 12 and the security server 1 is broken, the heartbeat stops and the content is not verified anymore.

Moreover, the security server 1 comprises a data provider 10 who can provide extra information about the content to the browser 12. This information can be used by the browser 12 to make the decision to stop showing the content.

Furthermore, the viewer 3 on the end-user's device manage data received from the service provider to make the decision to stop showing the content and is part of the remote end-user's device. The remote end-user's device contains the adapted web browser 12.

The adapted browser 12 of the end-user's device is constituted either by a web-application or by a usual browser adapted by a plug-in containing the code modules for implementing the hereafter functionalities:

setting up a connection with the security server 1, while a page is loaded from a web site.

during the connection, sending the address of the web site to be accessed by remote device to the security server 1.

collecting all user interactions and memorizing in the remote device memory at least until next request of the security server, and transmit them to the security server 1.

triggering a regular interval counter on setting up or on each regular interval detection;

detecting a heart beat on regular interval;

making decision of stop display on failure of heartbeat detection.

On set up of connection between the security server 1 and an end-user remote device web-application or plug-in triggers, a counter enables an end-user's device to retrieve on regular interval heartbeat sent by the security server 1 to the end-user remote device.

On failure of the heartbeat detection, the code module stops the display of information coming from the website.

In addition, the end user device maintains two separate communication channels or includes two communications port, one for accessing the web site, and a second for accessing with the security server 1 for the heartbeat.

In summarize, all actions made by the user are recorded, as well as the server where the connection took place: the security server 1 receives all the information collected by the collector 5, and extracted in the data mine 6. The data collected are compared to patterns of illegal models and images using an artificial intelligence algorithm 7 which realizes an image processing to detect object or patterns on the displayed content. Then, there are two possibilities: if no problem is detected, the data are sent to the terminal for display on the screen; if problems are detected, the heartbeat stop and the display of the contents is also stopped.

In conclusion, the invention proposes a browser extension collecting information on the user behavior and triggering a heartbeat on a security server, for security issue. It can be used in a multi-application terminal and in different applications as well like bank, payment, automatic purchasing, electrical charging points, automated teller machines (ATM), petrol stations . . . . It is first intended for the fiduciary but it can also be used to control advertising or even as connection point in coffee shops for example.

It should be also understood that the order of step of the process may be changed and executed in another order, unless it is obvious it could not be for technical reasons.

The invention claimed is:

1. A security server for dynamic verification of web content which runs artificial intelligence (AI) algorithms comprising:

a collector configured for receiving a collection of user interactions with a page from a website, the user interactions received from an end-user remote device and for simulating on the server a content of the page, loaded from a website, based on the user interactions received from the end-user remote device, and for sampling the outcome of these user interactions at irregular time intervals, the sampling resulting in a fixed image, preferably JPG or PNG, means for executing a data mining and artificial intelligence (AI) algorithm relying on image processing during a sample interval to compare object or patterns to the fixed image, a heartbeat generator for generating heartbeat at regular interval and send it at a continuous interval to the end-user remote device to indicate a result of the comparison.

2. The security server for dynamic verification of web content according to claim 1 comprising an alarm handler to log and trigger an alarm in case of mismatch in the comparison, stop the transmission of a heartbeat and to stop the heartbeat, when the connection between an adapted browser of the end-user remote device and the server is broken, and stop on the server the execution of artificial intelligence for this end-user remote device so that the content is not verified anymore.

3. The security server for dynamic verification of web content according to claim 1 comprising a data provider that can provide extra information about the content to the adapted browser, this information being used by the browser to make the decision to stop showing the content.

4. An end-user remote device comprising:

a processing capability for maintaining two separate communication channels, one for accessing a web site, and a second for accessing a security server for a heartbeat, and an adapted web browser with all functionalities of a 'regular' web browser but adapted for setting up a connection with the security server, on detection of a page loading on the end-user remote device and being adapted to memorize and send to the security server all user interactions made by the end-user, the end-user remote device further comprising:

a hardware and software arrangement able to retrieve a heartbeat from the server on a regular interval and to invalidate a display of the page to the end-user once this heartbeat communication is broken, or the heartbeat is not detected indicating the content of the page displayed to the end user is not verified or contains illegal objects or patterns.

5. The system comprising a security server according to claim 1 and an end-user remote device for visiting a web site according to claim 4.

6. The end-user remote device according to claim 4 wherein after the setup of a connection with the server, the end-user remote device comprises a hardware and software arrangement to send a message to the server to trigger a heartbeat signal between the server and the web browser.

7. The end-user remote device according to claim 4 wherein the adapted browser manage data received from the security server to make the decision on lack of heartbeat or on presence of extra information to stop showing the content.

8. The end-user remote device according to claim 4 wherein the remote device is with limited processing and/or digital signal processing (DSP) power and is working in real-time mode.

9. The end-user remote device according to claim 4 wherein the remote device is a mobile terminal such as for instance pad, smartphone, smartwatch, personal computer (PC).

10. The end-user remote device according to claim 4 wherein the device is a payment terminal accessing not only to specific banking network but also provided with extended web connection capabilities for enabling navigation on the web to access other services and a touch screen as human interface for interactions.

11. A method executed in a system comprising a security server and an end-user remote device, the method comprising the following steps:

web content is visited on the end-user remote device using an adapted web browser;

during the web content on the end-user remote device, the adapted web browser sets up a connection with the security server, during this setup, the security server triggers the generation of a heartbeat signal between the security server and the adapted web browser;

on the end-user remote device, interactions with the web content are memorized by the adapted browser and are sent to the security server, the security server accesses the web content and replays the interactions on the web content;

on a variable time interval, a sample of user output is taken on the security server;

this sample is checked with artificial intelligence of the security server against some pre-defined models and/or patterns memorized during a data mining process on a database:

if no similar objects or patterns are found in the sample, the security server stops generation of the heartbeat signal, and the adapted browser stops displaying the content, wherein the decision to stop displaying the content is made by the adapted browser, using the detection of lack of the heartbeat signal, if an object or pattern similar to the pre-defined models and/or patterns memorized on the database has been found in the sample, the heartbeat signal continues.

12. The method of claim 11, wherein the samples are resulting in a fixed image, preferably JPG or PNG, and the fixed image is checked by comparing with images of the database captured during a data mining process.

\* \* \* \* \*